United States Patent
Shirra

(10) Patent No.: US 8,234,859 B2
(45) Date of Patent: Aug. 7, 2012

(54) METHOD OF AND APPARATUS FOR EXHAUSTING INTERNAL COMBUSTION ENGINES

(75) Inventor: Thomas Shirra, Maroochydore (AU)

(73) Assignee: NG1 Technologies, LLC, Sarasota, FL (US)

( * ) Notice: Subject to any disclaimer, the term of this patent is extended or adjusted under 35 U.S.C. 154(b) by 89 days.

(21) Appl. No.: 11/988,419

(22) PCT Filed: Jul. 7, 2006

(86) PCT No.: PCT/AU2006/000965
§ 371 (c)(1),
(2), (4) Date: Jan. 29, 2008

(87) PCT Pub. No.: WO2007/006086
PCT Pub. Date: Jan. 18, 2007

(65) Prior Publication Data
US 2008/0148722 A1 Jun. 26, 2008

(30) Foreign Application Priority Data

Jul. 8, 2005 (AU) .............................. 2005903631

(51) Int. Cl.
*F02B 27/02* (2006.01)
(52) U.S. Cl. ............................... 60/312; 60/274; 60/324
(58) Field of Classification Search .................. 60/274, 60/286, 299, 324, 312
See application file for complete search history.

(56) References Cited

U.S. PATENT DOCUMENTS

| | | | | |
|---|---|---|---|---|
| 3,964,875 A | * | 6/1976 | Chang et al. | 422/176 |
| 4,050,539 A | | 9/1977 | Kashiwara | 181/280 |
| 4,339,918 A | | 7/1982 | Michikawa | 60/316 |
| 4,792,014 A | | 12/1988 | Shin-Seng | 181/280 |
| 5,001,899 A | * | 3/1991 | Santiago et al. | 60/274 |
| 5,152,366 A | * | 10/1992 | Reitz | 181/249 |
| 5,916,134 A | * | 6/1999 | Yang et al. | 60/299 |
| 6,796,296 B2 | * | 9/2004 | Kim | 123/590 |
| 6,889,500 B1 | | 5/2005 | Martinez | 60/312 |
| 7,581,387 B2 | * | 9/2009 | Bui et al. | 60/286 |
| 2005/0205355 A1 | | 9/2005 | Lin | 181/279 |

FOREIGN PATENT DOCUMENTS

| | | |
|---|---|---|
| AU | 2004-229110 A1 | 6/2005 |
| FR | 804.593 A | 10/1936 |
| JP | 09-256845 A | 9/1977 |
| JP | 2003-206740 A | 7/2003 |

OTHER PUBLICATIONS

International Search Report—dated Sep. 14, 2006, for PCT/AU2006/000965, 5 pages (in English).
International Preliminary Report on Patentability—dated May 17, 2007, for PCT/AU2006/000965, 4 pages (in English).

* cited by examiner

*Primary Examiner* — Thomas Denion
*Assistant Examiner* — Diem Tran
(74) *Attorney, Agent, or Firm* — Jacqueline M. Arendt; Arendt & Associates IP Group

(57) ABSTRACT

Exhausting apparatus for exhausting an internal combustion engine including an exhaust passage for flow of exhaust gases from the engine along an axis of the passage; one or more vanes mounted to an internal face the exhaust passage, said vanes being disposed in angular relationship to the axis of the passage and having a free edge spaced inwardly from and substantially coaxial with the internal face.

15 Claims, 2 Drawing Sheets

METHOD OF AND APPARATUS FOR EXHAUSTING INTERNAL COMBUSTION ENGINES

CROSS REFERENCE TO RELATED APPLICATIONS

This application is the U.S. National Stage of International Application No. PCT/AU2006/000965, which designated the United States and was filed on 7 Jul. 2006, published in English, which claims the benefit of Australian Provisional Patent Application No. 2005903631, filed on 8 Jul. 2005. The entire teachings of the above applications are incorporated herein by reference.

FIELD OF INVENTION

This invention relates to a method of and apparatus for exhausting internal combustion engines. The invention has application to all kinds of internal combustion engines including two-stroke, four-stroke and diesel engines, reciprocating and rotary engines.

BACKGROUND ART

Exhausting of internal combustions engines involves the provision of an exhaust system including an exhaust manifold into which the combustion products are directed from the combustion chamber or chambers of the engine and a pipe leading from the manifold to a silencer of muffler. A tail pipe is usually provided from the muffler, and it is also common to include a catalytic converter in the exhaust gas flow path, usually before the silencer.

The exhaust system nearly always produces a back-pressure when the engine is operating. It has been suggested by some that the back-pressure so generated is beneficial for efficient operation of internal combustion engines. More usually, a maximum back pressure is specified, but no minimum. It is believed by the inventor that the efficient removal of exhaust gases from the engine would provide better performance for internal combustion engines because less energy would be directed to pushing the exhaust gases through the exhaust system.

Exhaust systems have been proposed which include a spiral or helical path for part of the passage between the exhaust manifold and the end of the tail pipe. However, in such arrangements, the spiral flow path is a usually constrained one, or alternatively, only a small butterfly-type baffle is provided. As a result, the angular momentum imparted to the exhaust gases has been limited.

The present invention aims to provide a method of and apparatus for exhausting internal combustion engines which alleviates one or more of the inefficiencies or disadvantages of the prior art. Other aims and advantages of the invention may become apparent from the following description.

DISCLOSURE OF THE INVENTION

With the foregoing in view, this invention resides broadly in a method of exhausting internal combustion engines including:

receiving a flow of exhaust gases from an internal combustion engine into an exhaust passage;

generating a vortex in the flow of exhaust gases;

expelling the exhaust gases from the exhaust passage such that the gases so expelled include a torsional component.

In another aspect, the present invention resides broadly in a method of exhausting internal combustion engines including:

receiving a flow of exhaust gases from an internal combustion engine into an exhaust passage;

generating a vortex in a flow of gas or gases in operative association with the flow of exhaust gases whereby a torsional component of flow is imparted to the flow of exhaust gases; and expelling the exhaust gases from the exhaust passage.

In another aspect, the present invention resides broadly in exhausting apparatus for exhausting an internal combustion engine including:

an exhaust passage for flow of exhaust gases from the engine along an axis of the passage;

one or more vanes in operative association with the exhaust passage, said vanes being disposed in angular relationship to the axis of the passage.

The exhausting apparatus of the invention, in use, imparts a torsional component in the flow of exhaust gases. Preferably, the torsional component is imparted between the exhaust manifold and the muffler or silencer. More preferably, the torsional component is imparted downstream from any exhaust system component which would dissipate the torsional component whereby, in use, exhausted gases emerging from the orifice of the tail pipe include a vortex or torsional component. The torsional component may be imparted directly to the exhaust gases as they pass through the apparatus of the invention, or a torsional component may be imparted by inducting outside gases into the flowpath of the exhaust gases, and in so inducting, imparting a torsional component to the flow such that, by mixing with the exhaust gases, a torsional component is imparted to the mixed gas flow.

In a preferred form, a plurality of vanes is provided a length of pipe forming part of the exhaust system of an engine. The vanes are arranged at an angle to the axis of the pipe. Preferably, the vanes extend inward from the inner face of the pipe and are of substantially constant width. In one example of the invention, a length of pipe may be slit along part of its length, the slit being spiral of helical in form, and being able to be opened by twisting the pipe in the opposite direction to the direction of the spiral of the slit. A vane may be twisted in the same direction of the slit and inserted therein when opened. If the pipe is formed from a material having normal elasticity, and the vane is inserted such that its outer edge is aligned with the outer face of the pipe, when the twist in the pipe is relieved, the vane will be clamped by each side of the slit, and may be fixed in place. Since such pipes are typically constructed from metal, it may be appropriate for the fixing to be achieved by welding the vane in place. Moreover, a plurality of vanes may be added to the pipe in such manner, the vanes being of a height and number to generate a vortex in use, but not to restrict the flow of gases by being an obstruction. Indeed, it is preferred that the vortex generated in use be such that a negative pressure is imparted to the exhaust manifold.

BRIEF DESCRIPTION OF THE DRAWINGS

In order that the invention may be more readily understood and put into practical effect, reference will now be made to the accompanying drawings which illustrate one or more preferred embodiments of the invention and wherein:—

DETAILED DESCRIPTION OF THE DRAWINGS

Figure 1:
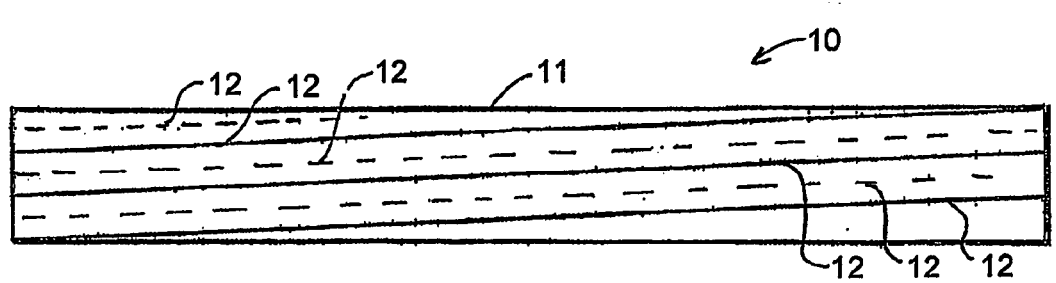
FIG. 1 is a diagrammatic sectional view of exhausting apparatus for exhausting internal combustion engines according to the invention have six vanes.
Figure 2:
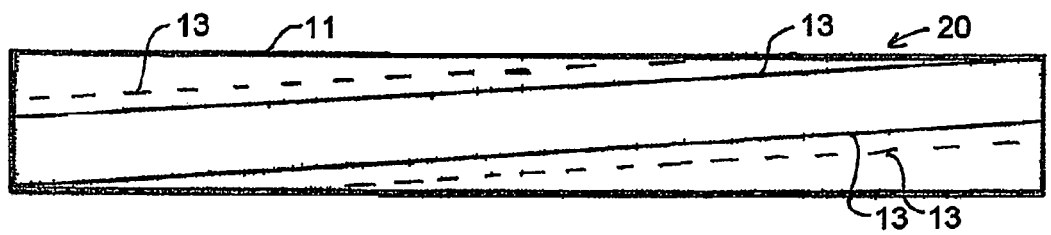
FIG. 2 is a diagrammatic view of exhausting apparatus for exhausting internal combustion engines similar to that of FIG. 1, but having four vanes.
Figure 3:
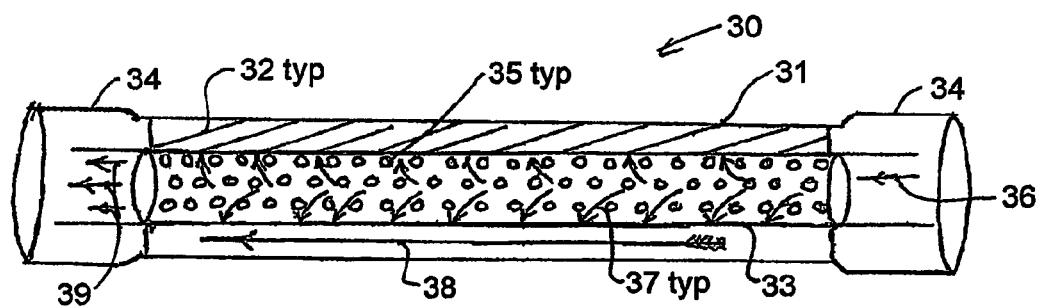
FIG. 3 is a diagrammatic sectional view of exhausting apparatus for exhausting internal combustion engines according to the invention and having a perforated inner tube.

The exhausting apparatus or pipe 10 shown in FIG. 1 includes a tube 11 having six vanes extending the length thereof, but formed into a spiral, turning approximately 90° around the circumference of the pipe, each vane being given reference numeral 12, three of which are represented in broken outline and the other three in solid outline. In FIG. 2, the tube 20 has four vanes shown typically at 13, two of which are shown in broken outline and two in solid outline. The pipe assembly 30 shown in FIG. 3 has an outer tube 31 coaxially surrounding an inner tube 33 through part of its length, the outer tube ending in two bell ends 34. The outer tube has a plurality of spiraled vanes shown typically at 32 extending between the inner face of the outer tube and the outer face of the inner tube. The inner tube also has a plurality of apertures or perforations set out on a regular diamond pattern about the circumference.

Exhaust gases can pass into the pipe in the direction of arrow 36 and some of the gas can pass through the perforations in the direction of arrows shown typically at 37, some of the gas passing along the annular region between the inner and outer tubes in the direction of arrow 38 and the remainder passing through the centre of the inner tube in the direction of the arrow 39. Exhaust gases enter into the vortex portion through the mesh (inner tube) and into a vortex chamber to create a vacuum from high speed spinning. In larger pipes, six vanes or blades can be used instead of four, and the pitch of the vanes can be provided at the appropriate angle to the axis of the pipe for imparting the torsional component to the gas flow.

Figure 4:
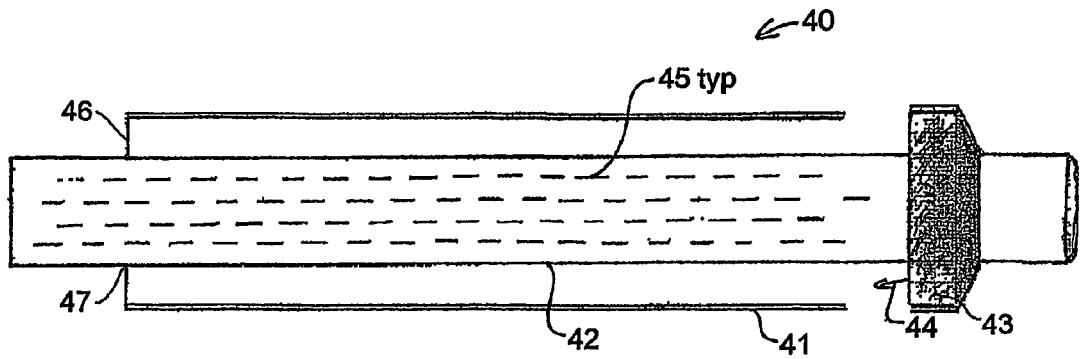
FIG. 4 is a diagrammatic sectional view of exhausting apparatus for exhausting internal combustion engines according to the invention and including an inner tube having vented sound slots.

The exhausting apparatus 40 shown in FIG. 4 is a very basic internal view of a vortex muffler according to the invention. The outer volume may change for decibel rating, but the inner tube will generally not change except in length to create the vortex effect. The muffler has an outer tube 41 and an inner tube 42 concentrically therein and extending beyond the length of the outer tube. An end plate 43 may be used to seal off one end of the annular portion between the inner and outer tubes by sliding the inner tube relative to the outer tube in the direction of arrow 44. Once the inner and outer tubes are in their respective relative positions, an annular end plate 46 may be welded in place around the inner tube at 47. The inner tube has a plurality of vented sound slots shown typically at 45.

Figure 5:
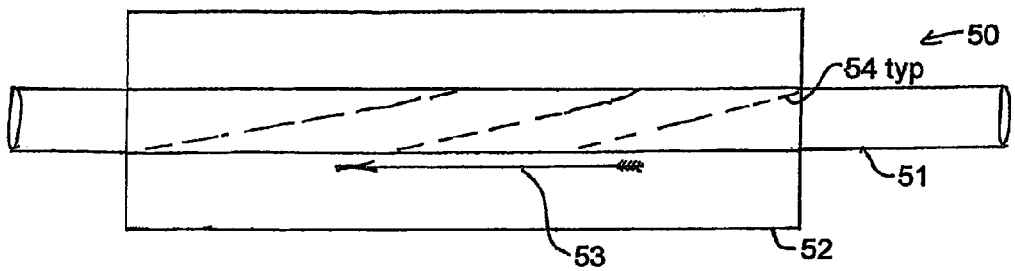
FIG. 5 is a diagrammatic sectional view of exhausting apparatus for the exhausting internal combustion engines according to the invention incorporating a silencer function.
Figure 6:
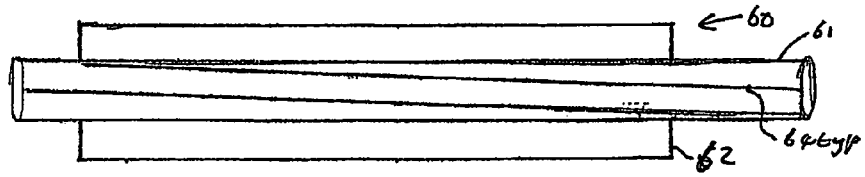
FIG. 6 is a diagrammatic sectional view of exhausting apparatus for exhausting internal combustion engines incorporating the tube of FIG. 2 into a basic muffler.

The turbo muffler version of the exhausting apparatus 50 is shown in FIG. 5 and is designed to give both large and small engines maximum performance, and be most effective in sports type vehicles that require to have a muffler that does not exceed decibel ratings. The pipe 51 passes through the silencer portion 52 and exhaust gases can pass therethrough in the direction generally of arrow 53, the vortex effect being created by the provision of vanes in accordance with the invention as shown typically at 54. A version of exhausting apparatus according to the invention similar to that shown and described in FIG. 5 is shown in FIG. 6, the reference numerals therein referring to similar parts to those of FIG. 5, but preceded by a "6" instead of a "5".

Figure 7:
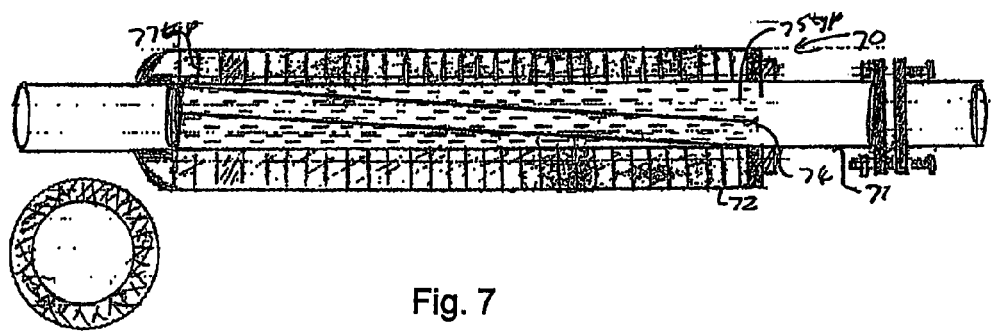
FIG. 7 is a diagrammatic sectional view of exhausting apparatus for exhausting internal combustion engines according to the invention showing a fully detachable muffler.

A fully detachable muffler is shown in FIG. 7, the sound baffles shown typically at 77, the vanes shown typically at 74 extending through the pipe 71, and a plurality of slots shown typically at 75 being provided along the length of the pipe within the muffler box 72.

Exhausting apparatus for exhausting internal combustion engines according to the invention may be attached to the exhaust manifold of an existing engine or new engine as the case may be. The system of the present invention is believed to be a breakthrough in engine technology and can enhance turbo and cyclone or ramflow induction. The system of the present invention is believed to provide a new dimension in exhaust gas flow allowing internal combustion engines to breathe more efficiently. It is believed that the inertial component of the torsional flow will improve cylinder filling and create maximum power by drawing a vacuum on the exhaust of the engine. Experimental use of the exhausting apparatus according to the invention has provided horsepower gains of 15%, gas flow gains of 25% or better, top end gain has been found to be even better than this. Dynamometer testing has shown lower carbon monoxide emissions, less fuel usage (15% to 20%) and much smoother running. It is believed that any internal combustion engine will benefit from the efficiencies created by gas flow by the installation of apparatus according to the invention. It is also believed that apparatus according to the invention minimises the problems that have been introduced in modern engines in respect of tubes, lines and pipes from different parts of the engine including the crank case, sump, carburetor, air filter and other parts of the engine in order to minimise emission of unburnt hydrocarbons.

In use, it is believed when installed on an internal combustion exhaust system, when the engine is running, gas starts to spin as it strikes the spiral fins in the turbo pipe, thus creating a vacuum that minimises velocity dampening that is caused by bends and other obstructions in the exhaust pipe or manifold. It is believed that exhausting apparatus according to the present invention will benefit engines by providing a greatly reduced back pressure to the manifold and valves, carbon monoxide may be reduced by the engine burning cleaner, reduced deposits in the manifold and the exhaust pipe are believed to occur, and exhaust emissions are believed to be cleaner and environmentally more friendly. In addition to the above, it is believed a better all round engine performance can be achieved.

Dynamometer testing has shown significant improvement in horsepower, by comparison with the system being disconnected and running straight through pipe, relatively the vortex system of the present invention made a 13% gain in horsepower on a standard automotive engine exhaust system with the inclusion of a vortex muffler according to the invention. It is presumed that more gain is possible. Moreover, testing has shown reduced manifold pressure and better mode of performance in every aspect.

It is believed that by providing a plurality of non-exclusive spiral passages in the exhaust system in accordance with the invention imparts a higher degree of angular momentum than has been provide by prior systems. Whilst not being bound by theory, nor limiting the scope of this invention thereto, the non-exclusive nature and radially displaced disposition of the axially elongate spiral baffles of the present invention can afford at least an opportunity for angular pseudo-forces such as the Coriolis effect and such like to be effected by providing a non-inertial reference frame within which cooling, and therefore, contracting gases with density increasing can pass. Such an effect may enhance negative back pressure to the combustions chamber during the exhaust cycle and assist in scavenging the combusted gases therefrom.

The exhausting apparatus of the present invention may also produce a cyclonic effect along the exhaust pipe. The cyclonic effect may extend from the location of the vanes which induce the angular component of exhaust gas flow back towards the exhaust manifold engine. Irrespective of whether a cyclonic effect is produced and whether such an effect extends back towards the exhaust manifold, while the invention is not to be construed as being limited to such an effect, it is believed that an increase in negative back-pressure to the exhaust system is effected when the invention as described herein is in use.

Although the invention has been described with reference to specific examples, it will be appreciated by persons skilled in the art that the invention may be embodied in other forms which are encompassed within the broad scope and ambit of the invention as defined by the following claims.

The invention claimed is:

1. An exhausting apparatus for exhausting an internal combustion engine including:
    an exhaust passage for directing flow of exhaust gases from the engine along an axis of the passage;
    one or more vanes extending substantially the length of the exhaust passage and formed into a spiral, turning around the circumference of the exhaust passage, and with a first edge mounted to an internal face of the exhaust passage, and a second edge spaced inwardly from and substantially coaxial with the internal face, said one or more vanes being of substantially constant width and being disposed in angular relationship to the axis of the exhaust passage, and configured to impart a torsional component to at least a portion of said exhaust gases while passing through said exhaust passage, with the provision that a configuration of vanes does not restrict or obstruct the flow of said exhaust gases.

2. The exhausting apparatus according to claim 1, wherein said one or more vanes are located so as to impart a torsional component to at least a portion of said exhaust gases passing through the exhaust passage between an exhaust manifold and a muffler.

3. The exhausting apparatus according to claim 1, wherein said one or more vanes are located to impart a torsional component to at least a portion of said exhaust gases passing through the exhaust passage downstream from any exhaust system component that can dissipate the torsional component.

4. The exhausting apparatus according to claim 1 and including outside gas induction means arranged in operative association with said one or more vanes for imparting a torsional component to at least a portion of said exhaust gases as they pass through the exhaust passage.

5. The exhausting apparatus according to claim 1, wherein said one or more vanes is provided as a plurality of vanes along a length of pipe forming part of an exhaust system of the internal combustion engine, the vanes being arranged at an angle to the axis of the pipe.

6. A method of exhausting an internal combustion engine including:
    providing the exhausting apparatus according to claim 1, whereby exhausted gases emerging from an orifice of a tail pipe operatively connected to the exhaust passage include the torsional component.

7. A method of exhausting an internal combustion engine including:
    providing the exhausting apparatus according to claim 1, whereby exhausted gases emerging from an orifice of a tail pipe operatively connected to the exhaust passage include the torsional component.

8. The exhausting apparatus according to claim 1, wherein the imparted torsional component to at least a portion of said exhaust gases forms a vortex in the exhaust passage.

9. The exhausting apparatus according to claim 8, wherein the vortex imparts a negative pressure to the engine.

10. A method of exhausting an internal combustion engine including:
    providing an exhausting apparatus according to claim 8, whereby exhausted gases emerging from an orifice of a tail pipe operatively connected to the exhaust passage include a vortex component.

11. A method of exhausting internal combustion engines including:
    receiving a flow of exhaust gases from an internal combustion engine into an exhaust passage having one or more vanes extending substantially the length of the exhaust passage and formed into a spiral with a first edge mounted to an internal face of the exhaust passage, and a second edge spaced inwardly from and substantially coaxial with the internal face, said one or more vanes being of substantially constant width, and being disposed in angular relationship to the axis of the exhaust passage, and configured to impart a torsional component to at least a portion of said exhaust gases while passing through said exhaust passage, with the provision that a configuration of vanes does not restrict or obstruct the flow of said exhaust gases;
    allowing said one or more vanes to impart a torsional component on at least a portion of said exhaust gases while passing through said exhaust passage; and
    expelling the exhaust gases from said exhaust passage such that at least a portion of the gases so expelled include a torsional component.

12. The method according to claim 11 wherein the torsional component includes a vortex generated in the flow of exhaust gases.

13. The method according to claim 12, wherein the vortex generated imparts a negative pressure to the engine.

14. A method of exhausting internal combustion engines including:
    receiving a flow of exhaust gases from an internal combustion engine into an exhaust passage having one or more vanes extending substantially the length of the exhaust passage and formed into a spiral, turning around the circumference of the exhaust passage, and with a first edge mounted to an internal face of the exhaust passage, and a free edge spaced inwardly from and substantially coaxial with the internal face, said one or more vanes being of substantially constant width and being disposed in angular relationship to the axis of the exhaust passage, and configured to impart a torsional component to at least a portion of said exhaust gases passing through said exhaust passage, with the provision that a configuration of vanes does not restrict or obstruct the flow of said exhaust gases;

generating a vortex in a flow of gas or gases in operative association with the flow of exhaust gases whereby a torsional component of flow is imparted to the flow of exhaust gases at least in part by said one or more vanes; and expelling the exhaust gases from the exhaust passage.

15. The method according to claim 14, wherein the vortex generated imparts a negative pressure to the engine.

* * * * *